(12) United States Patent
Shuck (10) Patent No.: US 11,986,911 B2
(45) Date of Patent: May 21, 2024

(54) WIRE FEEDSTOCK CONTROL DURING ADDITIVE MANUFACTURING

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 165 days.

(21) Appl. No.: 17/445,061

(22) Filed: Aug. 13, 2021

(65) Prior Publication Data

US 2023/0050995 A1 Feb. 16, 2023

(51) Int. Cl.
| | | |
|---|---|---|
| *B23K 37/047* | (2006.01) | |
| *B23K 26/03* | (2006.01) | |
| *B23K 26/342* | (2014.01) | |
| *B33Y 10/00* | (2015.01) | |
| *B33Y 30/00* | (2015.01) | |
| *B33Y 70/00* | (2020.01) | |

(52) U.S. Cl.
CPC ............ *B23K 37/047* (2013.01); *B23K 26/03* (2013.01); *B23K 26/342* (2015.10); *B33Y 10/00* (2014.12); *B33Y 30/00* (2014.12); *B33Y 70/00* (2014.12)

(58) Field of Classification Search
CPC .............. B23K 10/027; B23K 15/0086; B23K 26/0006; B23K 26/03; B23K 26/342; B23K 26/348; B23K 28/02; B23K 37/047; B23K 9/0953; B23K 9/0956; B23K 9/173; B33Y 10/00; B33Y 30/00; B33Y 50/02; B33Y 70/00; Y02P 10/25
See application file for complete search history.

(56) References Cited

U.S. PATENT DOCUMENTS

| 11,383,318 B2 | 7/2022 | Pistor et al. | |
| 2018/0050414 A1* | 2/2018 | Hughes | B23K 10/02 |
| 2018/0099346 A1* | 4/2018 | Zwayer | B23K 9/125 |

OTHER PUBLICATIONS

U.S. Appl. No. 17/445,063, filed Aug. 13, 2021, by Shuck et al.
Jafari et al., "Wire and arc additive manufacturing: Opportunities and challenges to control the quality and accuracy of manufactured parts", Jan. 2021, Materials and Design 202 (2021) 109471, 50 pgs.
Elmer et al., "Wire-based Additive Manufacturing of Stainless Steel Components", Apr. 10, 2019, The Welding Journal, 38 pgs.
Anderson et al., "Use of the Action Integral in EW Studies", Sandia Corporation, May 1959, 13 pgs.

(Continued)

*Primary Examiner* — Dana Ross
*Assistant Examiner* — Joe E Mills, Jr.
(74) *Attorney, Agent, or Firm* — Shumaker & Sieffert, P.A.

(57) ABSTRACT

An additive manufacturing system includes an energy source and a material delivery device. The energy source is configured to direct an energy beam toward a component to form a melt pool. The material delivery device is configured to feed a wire toward the melt pool to deposit material on the component. In some examples, the material delivery device is configured to discharge a current to the wire to disengage the wire from the melt pool. In some examples, the material delivery device is configured to measure an arc voltage between the wire and the component.

20 Claims, 5 Drawing Sheets

(56) References Cited

OTHER PUBLICATIONS

Adediran, "Automatic Error Detection and Correction in Laser Metal Wire Deposition—An Additive Manufacturing Technology", Master's Thesis, University of Tennessee, Dec. 2018, 54 pgs.

Li, "Analytical Process Modeling and Nonlinear Control of Melt-Pool Height and Temperature in Directed Energy Deposition", Dissertation in Department of Mechanical and Nuclear Engineering, Aug. 2017, 155 pgs.

Chaturvedi et al., "Wire Arc Additive Manufacturing: Review on Recent Findings and Challenges in Industrial Applications and Materials Characterization", Metals, Jun. 2021, 39 pgs.

Goffin et al., "Using wire shaping techniques and holographic optics to optimize deposition characteristics in wire-based laser cladding", Nov. 2016, 19 pgs.

Office Action from U.S. Appl. No. 17/445,063 dated Aug. 10, 2023, 22 pp.

Response to Office Action dated Aug. 10, 2023 from U.S. Appl. No. 17/445,063, filed Nov. 9, 2023, 9 pp.

Notice of Allowance from U.S. Appl. No. 17/445,063 dated Feb. 22, 2024, 8 pp.

* cited by examiner

WIRE FEEDSTOCK CONTROL DURING ADDITIVE MANUFACTURING

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing component to generate the three-dimensional structure. Additive manufacturing may be advantageous in many situations, such as rapid prototyping, forming components with complex three-dimensional structures, or the like. In some examples, additive manufacturing may utilize solid material and may melt the solid material into predetermined shapes to form the three-dimensional structures.

SUMMARY

In some examples, the disclosure describes an additive manufacturing system that includes an energy source and a material delivery device. The energy source is configured to direct an energy beam toward a component to form a melt pool. The material delivery device includes a feed actuator and control circuitry. The feed actuator is configured to feed a wire toward the melt pool. The control circuitry is configured to discharge a current to the wire to disengage the wire from the melt pool.

In some examples, the disclosure describes a method that includes controlling, by a computing device, an energy source to direct an energy beam toward a component to form a melt pool. The method further includes controlling, by the computing device, a material delivery device to feed a wire toward the melt pool and discharge a current to the wire to disengage the wire from the melt pool.

The details of one or more examples are set forth in the accompanying drawings and the description below. Other features, objects, and advantages will be apparent from the description and drawings, and from the claims.

DETAILED DESCRIPTION

The disclosure generally describes techniques and systems for controlling engagement and/or disengagement of a wire feedstock with or from a melt pool during an additive manufacturing process. During additive manufacturing, a component is built up by adding material to a component in sequential layers. The final component is composed of a plurality of layers of material. In some additive manufacturing techniques for forming components from metals or alloys, an energy source may direct energy at a component to form a melt pool. A material delivery device may feed a wire of material to the melt pool, such that at least some of the material partially melts and is joined to the component. The energy and material may move relative to the component to advance the melt pool along a predetermined deposition path. The melted material previously in the melt pool cools, as energy is no longer delivered to that location of the component (e.g., due to the energy source scanning the energy over the surface of the component).

During deposition of the material on to the component, the rate of energy delivered to the melt pool, the rate of material delivered to the melt pool, and the speed of advancement of the melt pool may form a melt pool having relatively steady state melt conditions, such that upon or shortly after reaching the melt pool, the wire is melted by the energy as the melt pool is advanced. However, during transient operations prior to or after deposition of a particular layer, the melt pool may not be at steady state. These transient operations may involve changes in temperature of the melt pool, changes in size of the melt pool, changes in feed rate of the wire feedstock, or other changes in parameters that require coordination between delivery of the feedstock, delivery of the energy, and relative movement of the melt pool.

One transient operation that may be relatively difficult to coordinate is conclusion of a predetermined deposition path and the corresponding disengagement of the wire feedstock from the melting pool. For example, once the melt pool completes the predetermined deposition path, an operator may stop directing energy at the component and retract the wire from the melt pool. If the wire is retracted before the melt pool has cooled and solidified, molten wire may cause bead distortion by deforming an end bead or dripping onto the bead. If the wire is retracted after the melt pool has cooled and solidified, the connected wire may cause damage to the material delivery device or break in a fragment.

According to principles described herein, a wire feed additive manufacturing system may be configured to disengage a wire feedstock from a melt pool by discharging a current through the wire feedstock. During deposition, the system may advance the melt pool along a predetermined deposition path on a component. Once the system advances the melt pool to the end of the deposition path, the system may disengage the wire feedstock from the melt pool. Rather than simply retract the wire feedstock from the melt pool, which may be difficult to correctly time with the melt dynamics of the melt pool, the system may discharge a current through the wire feedstock. This current may be sufficiently large such that at least a portion of the wire feedstock, such as a portion near the melt pool, may vaporize. The current may be supplied by a bank of capacitors, and may be adjusted based on various properties of the wire such as a diameter, length, and/or resistance. In this way, the wire feedstock may be more quickly (e.g., instantaneously) and accurately (e.g., with reduced beam deformation) disengaged from the melt pool compared to systems that retract the wire from the melt pool.

Another transient operation that may be difficult to coordinate is initiation of a predetermined deposition path and the corresponding engagement of the wire feedstock with the melt pool. For example, to initiate deposition, an operator may form a melt pool and feed the wire to the melt pool. If the wire contacts the melt pool prior to the melt pool reaching a sufficient size or temperature to melt the wire, the wire may penetrate through the melt pool or damage the feeding mechanism of the material delivery device. If the wire contacts the melt pool too long after the melt pool reaches a target size or temperature, the melt pool may be too large, leading to deformation of the bead track.

According to principles described herein, a wire feed additive manufacturing system may be configured to engage a wire feedstock with a melt pool by measuring an arc voltage corresponding to a distance between the wire feedstock and the melt pool and coordinating formation of the melt pool and feeding of the wire feedstock based on the distance. Upon initiating deposition, the system may first measure the distance between the wire and a portion of the component corresponding to the desired melt pool. To accurately measure the distance, the system may measure an arc voltage between the wire and the component. For example, the system may discharge a current to the wire to form an arc between the wire and the component and measure the arc voltage of the arc required to pass the current from the wire to the component. The arc voltage for the current corresponds to the distance between the wire and the component, and the system may coordinate formation of the melt and contact of the wire with the melt pool based on the arc voltage. For example, the system may feed the wire at a particular wire feed rate and energize an energy beam with sufficient time and energy for the energy beam to form the melt pool prior to the wire contacting the melt pool. In this way, the wire feedstock may more accurately engage the melt pool compared to systems that do not measure the distance between the wire and the component, or that measure the distance between the wire and the component using an optical method.

Figure 1A:
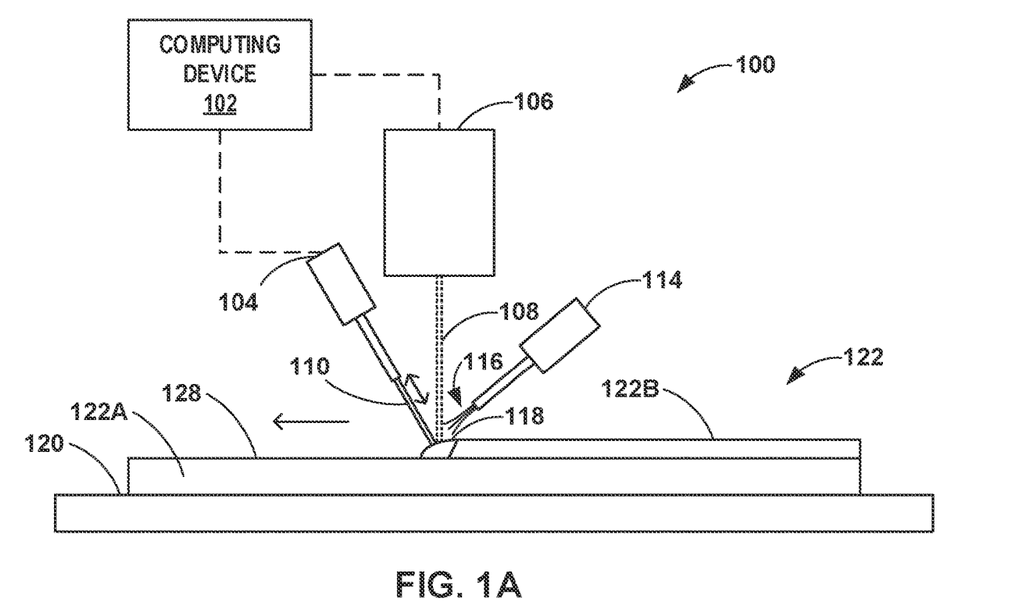
FIG. 1A is a conceptual block diagram illustrating an example additive manufacturing system.

FIG. 1A is a conceptual block diagram illustrating an example wire feed additive manufacturing system 100 for performing an additive manufacturing process. In the example illustrated in FIG. 1, system 100 includes a computing device 102, a material delivery device 104, an energy source 106, a shielding gas source 114, and a stage 120. In other examples, system 100 may include additional components or fewer components. For example, system 100 may include a heating device for pre-heating a component or wire feedstock prior to deposition or a cooling device for cooling a component after deposition of a particular layer. Computing device 102 is operably connected via one or more wired or wireless connections to material delivery device 104, energy source 106, and stage 120.

Component 122 may include any of a variety of components. In some examples, component 122 may be a component used in a high temperature mechanical system, such as an impeller, vane, or other component. Component 122 may be formed from a metal or metal alloy including, but not limited to, stainless steel, a nickel-based superalloy, aluminum, and the like. In the example of FIG. 1A, component 122 illustrates an intermediate component in the process of being formed, and for purposes of illustration, includes a first layer 122A and a second layer 122B. While first layer 122A is illustrated as a single layer, first layer 122A may include one or more layers that have been fully formed, while second layer 122B may include a layer that has been deposited along a predetermined deposition path that has not been fully formed.

Material delivery device 104 may be configured to deliver wire 110 to selected locations of component 122 being formed. At least some of wire 110 may contact melt pool 118 in component 122. Wire 110 that impacts melt pool 118 may be joined to component 122. Material delivery device 104 may deliver wire 110 to the surface of component 122 by feeding wire 110 from a spool or other continuous feed mechanism. In some examples of a wire additive manufacturing system, material delivery device 104 may include a device that feeds a terminal end of the wire into melt pool 118. Further operation of material delivery device 104 will be described in FIG. 1B below.

Energy source 106 may be configured to generate (i.e., energize) an energy beam 108 and direct energy beam 108 toward a focal point at a surface 128 of a component 122 to form a melt pool 118 during the additive manufacturing process. Energy source 106 may direct energy beam 108 to, and form melt pool 118 at, a portion of component 122 intended for deposition of a material. Energy source 106 may include a laser source, an electron beam source, plasma source, or another source of energy that may be absorbed by component 122 to form melt pool 118 and/or be absorbed by wire 110. Example laser sources include a CO laser, a $CO_2$ laser, a Nd:YAG laser, or the like. In some examples, energy source 106 may be selected to provide energy with a predetermined strength and/or wavelength or wavelength spectrum that may be absorbed by component 122 and/or wire 110 during the additive manufacturing technique. In some examples, energy source 106 may include an optical system configured to modify energy beam 108, such as through a collimator, a shaping unit such as an axicon, a beam guide, a beam splitter, a reflector, or other optical devices configured to aim, focus, or otherwise direct energy beam 108 toward predetermined positions at or adjacent to surface 128 of component 122. In some examples, energy source 106 may include or define an energy delivery head. The energy delivery head may be movable in at least one dimension (e.g., translatable and/or rotatable) under control of computing device 102 to direct the energy toward a selected location at or adjacent to a surface of component 122.

Energy source 106 may produce energy beam 108 having properties, such as strength or frequency, that produce melt pool 118 having particular thermal dynamics corresponding to a particular operation of system 100, such as a transient or steady state operation. For example, during initiation of melt pool 118, energy beam 108 may have a relatively high strength, such that melt pool 118 may heat more quickly to a target temperature at or above a melting point of the material. As another example, during deposition of material from wire 110, energy beam 108 may have a relatively moderate strength configured to melt wire 110 at a rate substantially equal to a feed rate of wire 110.

In some examples, system 100 includes shielding gas source 114 or another device or system configured to protect high temperature material from reaction with gaseous elements in an environment, such as oxygen or water vapor. Shielding gas source 114 is configured to discharge an inert or semi-inert shielding gas 116 toward melt pool 118 to create an inert atmosphere around melt pool 118. A variety of inert or semi-inert gases may be used for shielding gas including, but not limited to, helium, argon, carbon dioxide, nitrogen, and the like. While system 100 is illustrated as including shielding gas source 114, in other examples, an enclosure encasing system 100 and a vacuum pump may be used to create a vacuum.

System 100 includes an actuation system, such as stage 120, configured to generate relative movement between component 122 and both/either energy beam 108 and/or wire 110. For example, the actuation system may be configured to move a position of component 122, a position of energy source 106 and material delivery device 104, and/or an orientation of energy source and material delivery device 104. The actuation system may be configured to generate the relative movement to advance melt pool 118 along a predetermined deposition path. For example, as will be explained further below, system 100 may deposit material along a predetermined deposition (or build) path, such that melt pool 118 may represent a leading edge of the predetermined deposition path. In some examples, the actuation system may be configured to output an indication of a position of melt pool 118, such as a position of a focal point of energy source 106, such as to computing device 102. The position of melt pool 118 and/or position of the focal point of energy source 106 may indicate an extent of deposition of the material along the predetermined deposition path.

In the example of FIG. 1A, the actuation system includes stage 120. Stage 120 may be configured to selectively position and restrain component 122 in place relative to stage 120 during manufacturing of component 122. In some examples, stage 120 may be movable relative to energy source 106 and/or energy source 106 may be movable relative to stage 120. Similarly, stage 120 may be movable relative to material delivery device 104 and/or material delivery device 104 may be movable relative to stage 120. For example, stage 120 may be translatable and/or rotatable along at least one axis to position component 122 relative to energy source 106 and/or material delivery device 104. Similarly, energy source 106 and/or material delivery device 104 may be translatable and/or rotatable along at least one axis to position energy source 106 and/or material delivery device 104, respectively, relative to component 122.

Computing device 102 is configured to control components of system 100 and may include, for example, a desktop computer, a laptop computer, a workstation, a server, a mainframe, a cloud computing system, or the like. Computing device 102 is configured to control operation of system 100, including, for example, material delivery device 104, energy source 106, and/or stage 120. Computing device 102 may be communicatively coupled to material delivery device 104, energy source 106, shielding gas source 114, and/or stage 120 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 102 may be configured to control operation of material delivery device 104, energy source 106, and/or stage 120 to position component 122 relative to material delivery device 104, energy source 106, and/or stage 120. For example, as described above, computing device 102 may control stage 120 and material delivery device 104, and/or energy source 106 to translate and/or rotate along at least one axis to position component 122 relative to material delivery device 104 and/or energy source 106. Positioning component 122 relative to material delivery device 104 and/or energy source 106 may include positioning a predetermined surface (e.g., a surface to which material is to be added) of component 122 in a predetermined orientation relative to material delivery device 104 and/or energy source 106.

Computing device 102 may be configured to control system 100 to deposit layers 122A and 122B to form component 122. As illustrated in FIG. 1, component 122 may include a first layer 122A and a second layer 122B, although many components may be formed of additional layers, such as tens, hundreds, thousands, or the like. Component 122 is simplified in geometry and the number of layers compared to many components formed using additive manufacturing techniques. Although techniques are described herein with respect to component 122 including first layer 122A and second layer 122B, the technique may be extended to components with more complex geometry and any number of layers.

To form component 122, computing device 102 may control material delivery device 104 and energy source 106 to form, on a surface 128 of first layer 122A, a second layer 122B using an additive manufacturing technique. Computing device 102 may control energy source 106 to deliver energy beam 108 to a volume of material at or near surface 128 to form melt pool 118. For example, computing device 102 may control the relative position of energy source 106 and stage 120 to direct energy beam 108 to form melt pool 118. Computing device 102 also may control material delivery device 104 to deliver wire 110 to melt pool 118. For example, computing device 102 may control the relative position of material delivery device 104 and stage 120 to direct wire 110 at or on to melt pool 118.

Figure 1B:
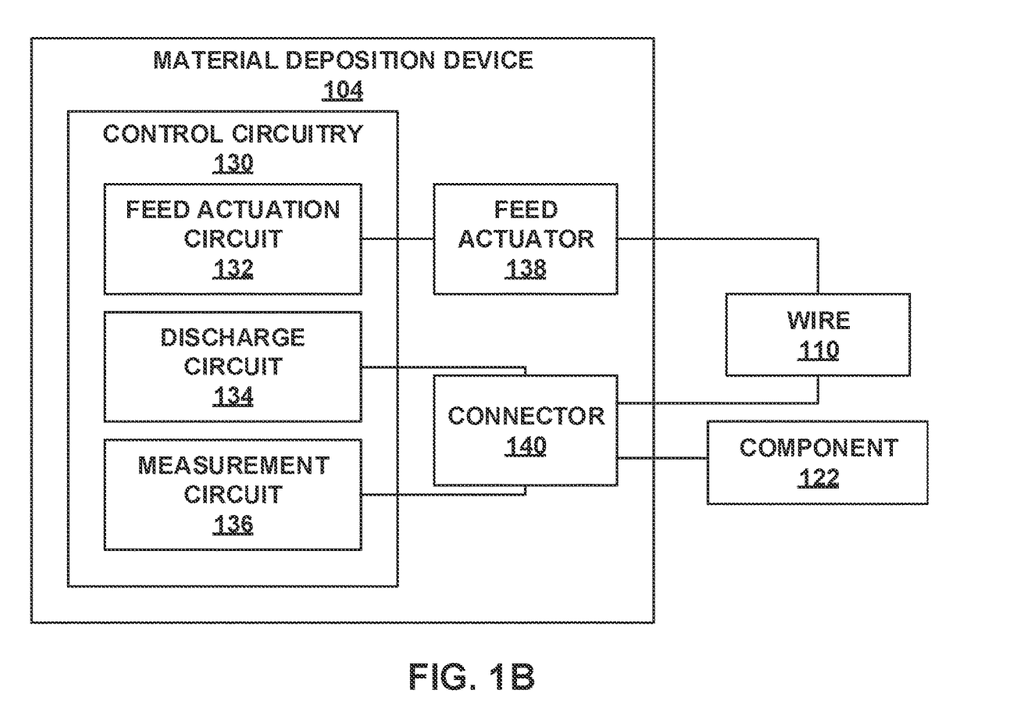
FIG. 1B is a conceptual block diagram illustrating an example material delivery device of the example additive manufacturing system of FIG. 1A.

In addition to the deposition process described above, computing device 102, in combination with material delivery device 104, may coordinate initiation and/or conclusion of deposition of material to form component 122. FIG. 1B is a conceptual block diagram illustrating an example material delivery device 104 of the example wire feed additive manufacturing system 100 of FIG. 1A.

Material delivery device 104 includes a feed actuator 138 configured to feed wire 110 toward component 122, such as melt pool 118 or a portion of component 122 intended to form melt pool 118, such as a leading edge of a partial layer or surface of a completed layer. Feed actuator 138 may include a variety of actuators including, but not limited to, rotary actuators such as spools, linear actuators, and the like.

Material delivery device 104 includes control circuitry 130. Control circuitry 130 is configured to control various operations of material delivery device 104 associated with engagement, deposition, and disengagement of wire 110 with component 122. Control circuitry 130 may be configured to receive control signals from computing device 102 and execute various operations and parameters of operations indicated by the control signals. In some examples, control circuitry 130 may be configured to control feeding of wire 110 during various steady state and transient operations involved in deposition of material on component 122.

Control circuitry 130 may include a feed actuation circuit 132, a discharge circuit 134, and a measurement circuit 136. Feed actuation circuit 132 is electrically coupled to feed actuator 138. Material delivery device 104 includes one or more connectors 140 (illustrated in FIG. 1B as a single connector 140). Connector 140 is configured to electrically coupled control circuitry 130 to wire 110 and component 122. For example, when wire 110 and component 122 are in contact, control circuitry 130, connector 140, wire 110, and component 122 may form a circuit. In the example of FIG. 1B, connector 140 is electrically coupled to both measurement circuit 136 and discharge circuit 134, such that connector 140 may transmit current to wire 110 from both/either discharge circuit 134 and/or measurement circuit 136.

Feed actuation circuit 132 is configured to control feed actuator 138 based on control signals received by control circuitry 130. For example, feed actuation circuit 132 may be configured to control a wire feed rate and a wire feed direction of feed actuator 138, such as by supplying power to feed actuator 138. Example feed operations controlled by control circuitry 130 may include, but are not limited to, feeding wire 110 at a particular feed rate in a first direction to contact melt pool 118 and retracting wire 110 at a particular feed rate in a second direction to withdraw wire 110 from melt pool 118.

Discharge circuit 134 is configured to discharge current to wire 110 to disengage wire 110 from melt pool 118. In some examples, such discharge may be in response to a control signal indicating disengagement of wire 110. The discharged current is configured to cause a physical discontinuity between material delivery device 104 and melt pool 118. In some examples, the current is configured to vaporize at least a portion of wire 110 to separate a proximal portion of wire 110 from melt pool 118.

Without being limited to any particular theory, a burst of current through wire 110 may cause wire 110 to heat. The amount of heating may be dependent on a variety of factors such as a volume of wire 110 being heated, as represented by a cross-sectional area of wire 110 and a length of wire 110, and various material properties of wire 110, such as a resistance of wire 110 and a heat capacity of wire 110. If the current in wire 110 is high enough, wire 110 may heat above a melting point, and optionally a boiling or sublimation point, to melt, vaporize, or sublimate at least a portion of wire 110 to create a discontinuity of wire 110. In some instances, the portion of wire 110 most likely to change phase may be a junction between wire 110 and melt pool 118, as wire 110 may have a relatively low cross-sectional area compared to melt pool 118 and a relatively high temperature compared to a more proximal portion of wire 110 closer to material delivery device 104. As a result of the current, the phase changed portion of wire 110 may produce a relatively clean discontinuity from melt pool 118, such that melt pool 118 may melt or otherwise reduce remaining deformation caused by the disengagement.

Discharge circuit 134 may be configured to store and discharge energy for generating a discharge current in any of a variety of ways. In some examples, discharge circuit 134 may include one or more capacitors configured to discharge the current. For example, the one or more capacitors may form a bank of parallel capacitors that provide a particular voltage of energy. Various capacitors may be configured to be individually or collectively selectable to provide a current having a particular current strength.

In some examples, discharge circuit 134 may be configured to discharge a current having a particular current strength based on one or more parameters of wire 110. Discharge circuit 134 may be configured to receive an indication or measurement of parameters of wire 110 such as a resistance of wire 110, a cross-sectional area of wire 110, or a length of wire 110, and select one or more capacitors to produce a current sufficient to disengage wire 110 in a desired amount of time based on the various parameters. For example, a thinner wire may not require as high a current strength to heat wire 110 compared to a thicker wire, such that fewer capacitors in the bank of capacitors may be selected and controlled for discharging the current.

In some examples, discharge circuit 134 is further configured to detect, after discharge of the current, an open circuit in wire 110 to verify disengagement of wire 110 from melt pool 118. For example, while wire 110 is contacting component 122, wire 110, component 122, connector 140, and discharge circuit 134 may form a closed circuit. Upon creation of the physical discontinuity in wire 110, wire 110 may no longer contact component 122, creating an open circuit. Discharge circuit 134 may be configured to continuously, periodically, or after discharge of the disengagement current, deliver voltage to wire 110 to detect whether a current is delivered to wire 110. If no current is delivered, discharge circuit 134 may indicate that wire 110 has become disengaged from melt pool 118.

Computing device 102 may be configured to interface with discharge circuit 134 to disengage wire 110 from melt pool 118 by sending a control signal to material delivery device 104 to discharge the current to wire 110. The control signal may be part of a completion procedure to end deposition of material on component 122. In some examples, computing device 102 may be configured to send this control signal based on progress of deposition of the material along the predetermined deposition path. For example, to control system 100 to deposit material along the predetermined deposition path, computing device 102 may be configured to receive an input signal representing one or more dimensions corresponding to the predetermined deposition path. During deposition, computing device 102 may be configured to receive an indication of a position of melt pool 118, such as an indication of a position of the focal point of energy source 106, along a deposition path. In response to receiving an indication of a position of the melt pool corresponding to completion of the deposition path, such as an indication of a position of the focal point of energy source 106 corresponding to completion of the deposition path, computing device 102 may be configured to automatically send the control signal to material delivery device 104 to discharge the current.

Computing device 102 may be configured to disengage wire 110 from melt pool 118 as part of a more comprehensive procedure to end deposition of material on component 122. In some examples, computing device 102 may be configured to control energy source 106 to stop directing energy beam 108, such that melt pool 118 may no longer be maintained. For example, computing device 102 may be configured to send a control signal to energy source 106 to cease outputting (or "deenergize") energy beam 108. In some examples, this cessation of outputting or deenergizing may occur substantially simultaneously with the discharge of current to wire 110. For example, computing device 102 may send the control signal to cease outputting energy beam 108 substantially simultaneously with sending the control signal to material delivery device 104. In some examples, computing device 102 may be configured to automatically send a control signal to energy source 106 to cease outputting energy beam 108 in response to receiving the indication of the position of melt pool 118 corresponding to completion of the deposition path.

Measurement circuit 136 is configured to measure an arc voltage between wire 110 and component 122. The arc voltage may represent a distance between wire 110 and component 122. In some examples, the measurement may be in response to a control signal indicating measurement of the arc voltage. In some examples, measurement circuit 136 may be configured to discharge a current to wire 110 to generate an arc from wire 110 to component 122. In some examples, measurement circuit 136 may be configured to measure the arc voltage of the arc between wire 110 and component 122.

Without being limited to any particular theory, a voltage applied to wire 110 may exceed a breakdown threshold of a gas between wire 110 and component 122 and cause flow of current (i.e., an arc) between wire 110 and component 122. The amount of voltage required to exceed the threshold (i.e., arc voltage) may be dependent on a variety of factors such as a distance between a distal end of wire 110 and component 122, an ionization potential of shielding gas 116 (or other gaseous intermediate between wire 110 and component 122), and a pressure of shielding gas 116. For a particular shielding gas, the minimum voltage to generate current through the gas may correspond to a minimum distance between wire 110 and component 122. In some instances, this minimum distance may be a distance from wire 110 to a portion of component 122 intended for melt pool 118, while in other examples, the minimum distance may be a distance from wire 110 to another portion of component 122 that may be closer than a portion of component 122 intended for melt pool 118.

In some examples, measurement circuit 136 may be configured to control the voltage for measuring the arc voltage in any of a variety of ways. In some examples, measurement circuit 136 may include a voltage controller configured to generate a variable voltage, such as by using a variable resistor. For example, measurement circuit 136 may be configured to gradually increase a voltage to wire 110, such as according to an analog or step-wise increase, until an electrical current flows between wire 110 and component 122 and indicate this voltage as the arc voltage.

In some examples, measurement circuit 136 is configured to determine, based on the arc voltage, the distance between wire 110 and a portion of component 122 corresponding to melt pool 118. For example, measurement circuit 136 may receive an indication of shielding gas 116, or an ionization potential of shielding gas 116. In some examples, such as examples in which a portion of component 122 intended to form melt pool 118 is not a closest portion of component 122 to wire 110, measurement circuit 136 may receive an indication of an orientation of wire 110, such as an angle of a feed path of wire 110. Measurement circuit 136 may determine, based on the measurement arc voltage, ionization behavior (e.g., ionization potential) of shielding gas 116, and optionally the orientation of the feed path of wire 110, a distance along the feed path of wire 110 toward the portion of component 122 intended to form melt pool 118.

Computing device 102 may be configured to interface with measurement circuit 136 to engage wire 110 with melt pool 118 by sending a control signal to measurement circuit 136 to measure the arc voltage. In some examples, computing device 102 is configured to receive an indication of initiation of deposition and, in response, automatically send a control signal to material delivery device 104 to measure the arc voltage.

Computing device 102 may be configured to receive, from measurement circuit 136, an indication of the distance between wire 110 and melt pool 118 and control system 100 based on the measured distance. In some examples, computing device 102 may be configured to determine, based on the arc voltage, a travel time of wire 110 to a portion of component 122 intended to form melt pool 118. For example, computing device 102 may receive an indication of a desired feed rate of wire 110, such as a default feed rate for engagement of wire 110 with melt pool 118, and determine, based on the arc voltage and the desired feed rate of wire 110, a travel time representing an amount of time for wire 110 to contact a portion of component 122 intended to form melt pool 118 along the feed path of wire 110.

Computing device 102 may be configured to measure the arc voltage between wire 110 and component 122 as part of a more comprehensive procedure to engage wire 110 with melt pool 118 and continue deposition of material on component 122. In some examples, computing device 102 may be configured to send a control signal to energy source 106 to energize energy beam 108 based on the travel time of wire 110 to melt pool 118. For example, melt pool 118 may require a particular heating time at a particular strength of energy beam 108 to heat a portion of component 122 to a temperature above a melting point of the material of component 122 to form melt pool 118. As such, computing device 102 may be configured to coordinate the heating time of melt pool 118 with the travel time of wire 110, such that wire 110 may contact melt pool 118 after melt pool 118 has formed. In some examples, computing device 102 is configured to determine the heating time to form melt pool 118. For example, computing device 102 may receive an indication of a desired strength of energy beam 108 to form melt pool 118 of a particular size, such as a default strength for forming melt pool 118, and determine, based on the strength of energy beam 108 and properties of component 122, the heating time of melt pool 118. Computing device 102 may be configured to send a control signal to energy source 106 to energize energy beam 108 accounting for the heating time to cause wire 110 to contact melt pool 118 after the heating time. In examples in which the heating time of melt pool 118 is greater than the travel time of wire 110, computing device 102 may control material delivery device 104 and/or energy source 106, such as a wire feed rate of wire 110 or a strength of energy beam 108, such that the heating time is less than the travel time.

Figure 2A:
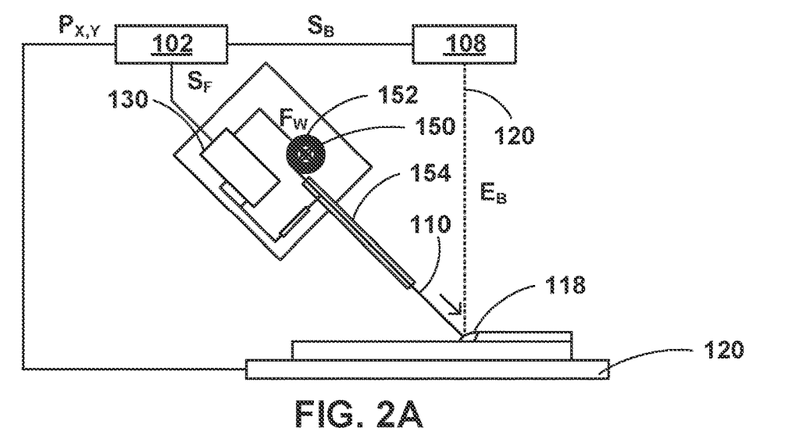
FIG. 2A is a side view conceptual diagram illustrating deposition of a material on a substrate during an example additive manufacturing process.
Figure 2B:
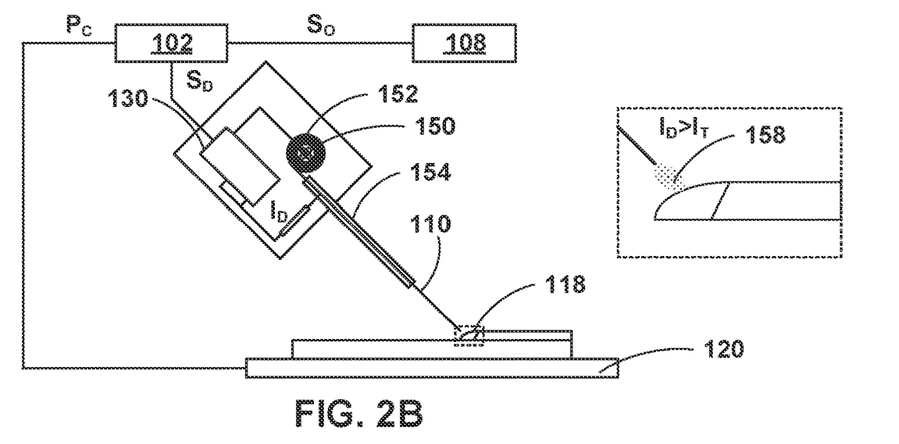
FIG. 2B is a side view conceptual diagram illustrating disengagement of a material from a substrate during an example additive manufacturing process.
Figure 2C:
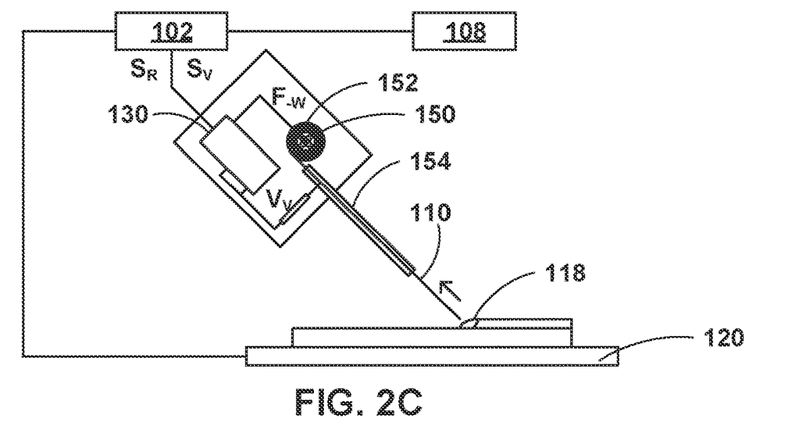
FIG. 2C is a side view conceptual diagram illustrating verification of disengagement of a material from a substrate.
Figure 3:
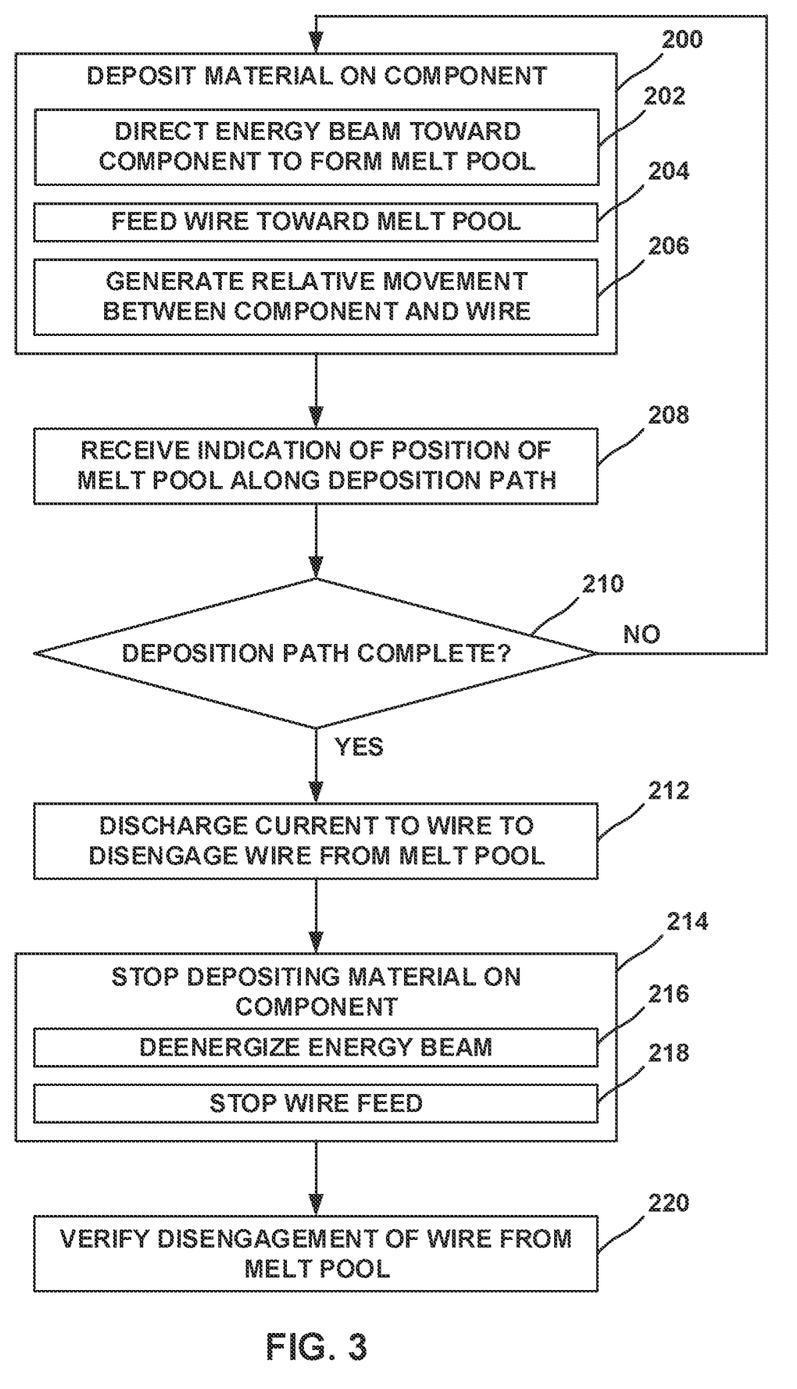
FIG. 3 is a flow diagram illustrating an example technique for controlling an additive manufacturing process.

FIGS. 2A, 2B, 2C, and 3 illustrate an example technique for controlling an additive manufacturing process. FIG. 2A is a side view conceptual diagram illustrating deposition of a material on a substrate, FIG. 2B is a side view conceptual diagram illustrating disengagement of a material from a substrate, FIG. 2C is a side view conceptual diagram illustrating verification of disengagement of a material from a substrate, and FIG. 3 is a flow diagram illustrating the example technique for controlling the additive manufacturing process. The technique of FIG. 3 will be described with reference to FIGS. 2A, 2B, and 2C. A person having ordinary skill in the art will appreciate that the technique of FIG. 3 may be implemented using other systems. System 100 of FIGS. 2A-2C may correspond to system 100 of FIGS. 1A and 1B, including feed actuator 138 as motor 150 and spool 152, and material delivery device 104 including a channel 154 for feeding wire 110.

Referring to FIG. 2A, the method of FIG. 3 includes depositing material on component 122 (200). Deposition of material on component 122 may include directing, by energy source 106, energy beam 108 toward 122 to form melt pool 118 (202). For example, computing device 102 may control ($S_B$) energy source 106 to generate energy beam having a particular strength ($E_B$) and direct energy beam 108 toward component 122 to form melt pool 118. Deposition of material on component 122 may also include feeding, by material delivery device 104, wire 110 toward melt pool 118 (204). For example, computing device 102 may control ($S_F$) material delivery device 104 to feed wire 110 toward the melt pool 118 at a particular wire feed rate ($F_W$). As a result, energy beam 108 and wire 110 may form melt pool 118 having a particular material deposition rate (e.g., material for period of time). Deposition of material on component 122 may also include generating, by an actuator system such as stage 120, relative movement between component 122 and wire 110 (206). For example, computing device 102 may receive an input signal representing one or more dimensions corresponding to the deposition path and control stage 120 to move component 122 relative to wire 110 and energy beam 108 to advance melt pool 118 along a predetermined deposition path, such as to a particular position ($P_{X,Y}$) or along a particular orientation and at a particular speed. As a result, system 100 may deposit material along the predetermined deposition path at a particular material deposition rate (e.g., material per distance).

As system 100 deposits material on component 122, computing device 102 may receive indications of a position of melt pool 118 along the predetermined deposition path (208), such as indications of a position of a focal point of energy source 106. As one example, computing device 102 may receive, from stage 120, an indication of a position of melt pool 118 along the predetermined deposition path. As another example, computing device 102 may receive, from energy source 106, an indication of a position of a focal point of energy source 106 along the predetermined deposition path. Computing device 102 may monitor the position ($P_{X,Y}$) of melt pool 118 to determine whether melt pool 118 has completed the predetermined deposition path (210). In response to computing device 102 receiving an indication of a position of melt pool 118 and/or a position of the focal point of energy source 106 that does not indicate completion of the predetermined deposition path, system 100 may continue to deposit material on component 122.

Referring to FIG. 2B, in response to computing device 102 receiving an indication of a position ($P_C$) of melt pool 118 corresponding to completion of the deposition path, material delivery device 104 discharges a current to wire 110 to disengage wire 110 from melt pool 118 (212). For example, computing device 102 may control ($S_D$) material delivery device 104 to discharge the current ($I_D$) to wire 110, such that the discharge current ($I_D$) exceeds a threshold current ($I_T$) to disengage wire 110 from melt pool 118. The current is configured to vaporize at least a portion 158 of wire 110 to separate a proximal portion of wire 110 from melt pool 118. In some examples, the current used to disengage wire 110 may be controlled based on one or more material parameters. For example, computing device 102 may determine, based on a thickness and a resistance of wire 110, the current and control material delivery device 104 to discharge the determined current to wire 110.

The method of FIG. 3 may include stopping deposition of material on component 122 (214). Stopping deposition of material on component 122 may include ceasing outputting energy beam 108 (216). For example, computing device 102 may control ($S_O$) energy source 106 to cease outputting energy beam 108. In some examples, computing device 102 may control energy source 106 to cease outputting energy beam 108 substantially simultaneously with controlling material delivery device 104 to discharge the current. For example, computing device 102 may control energy source 106 to cease outputting energy beam 108 in response to receiving the indication of the position of melt pool 118 and/or the position of the focal point of energy source 106 corresponding to the completion of the deposition path. Stopping deposition of material on component 112 may include stopping feeding of wire 110 (218). For example, computing device 102 may control material delivery device 104 to stop feeding wire 110.

Referring to FIG. 2C, in some examples, the method of FIG. 3 may include verifying disengagement of wire 110 from melt pool 118 (220). For example, measurement circuit 136 may apply, after discharge of the current, a voltage ($V_V$) to wire 110 and detect whether wire 110 and component 122 form an open circuit. In response to detecting an open circuit in wire 110, measurement circuit 136 may send an indication of the open circuit to computing device 102. Computing device 102 may receive the indication of the open circuit to verify disengagement of wire 110 from melt pool 118. Once disengagement has been verified, computing device 102 may control ($S_R$) material delivery device 104 to retract ($F_{-W}$) wire 110.

Figure 4A:
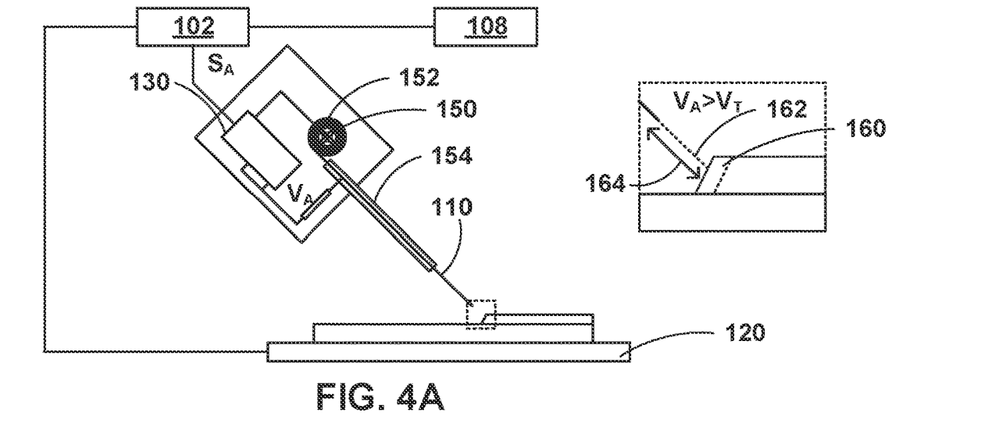
FIG. 4A is a side view conceptual diagram illustrating measurement of distance between a material and a substrate during an example additive manufacturing process.
Figure 4B:
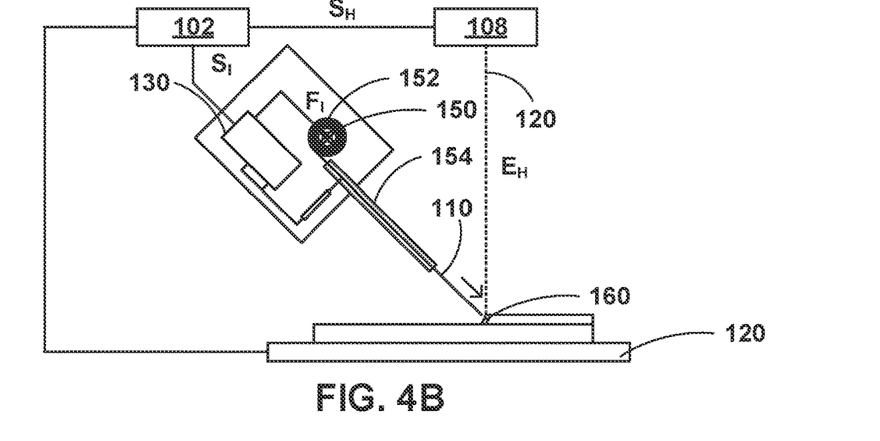
FIG. 4B is a side view conceptual diagram illustrating pre-engagement of a material with a substrate during an example additive manufacturing process.
Figure 4C:
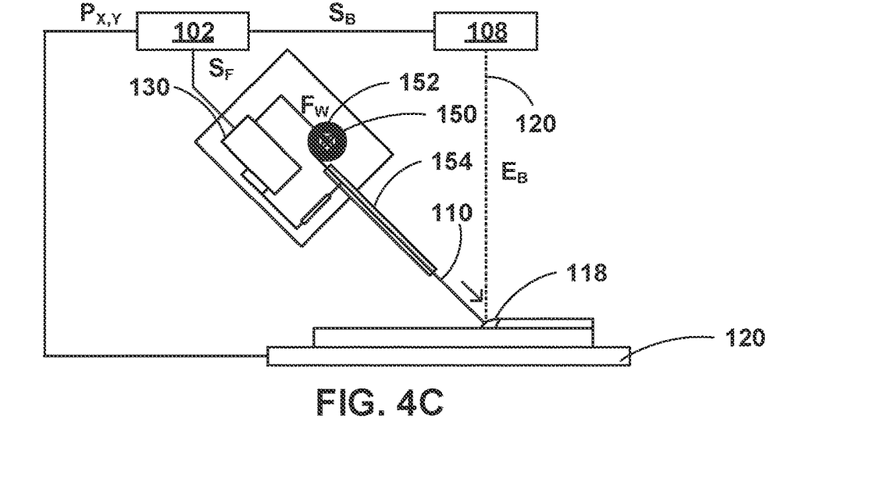
FIG. 4C is a side view conceptual diagram illustrating engagement of a material with a substrate during an example additive manufacturing process.
Figure 5:
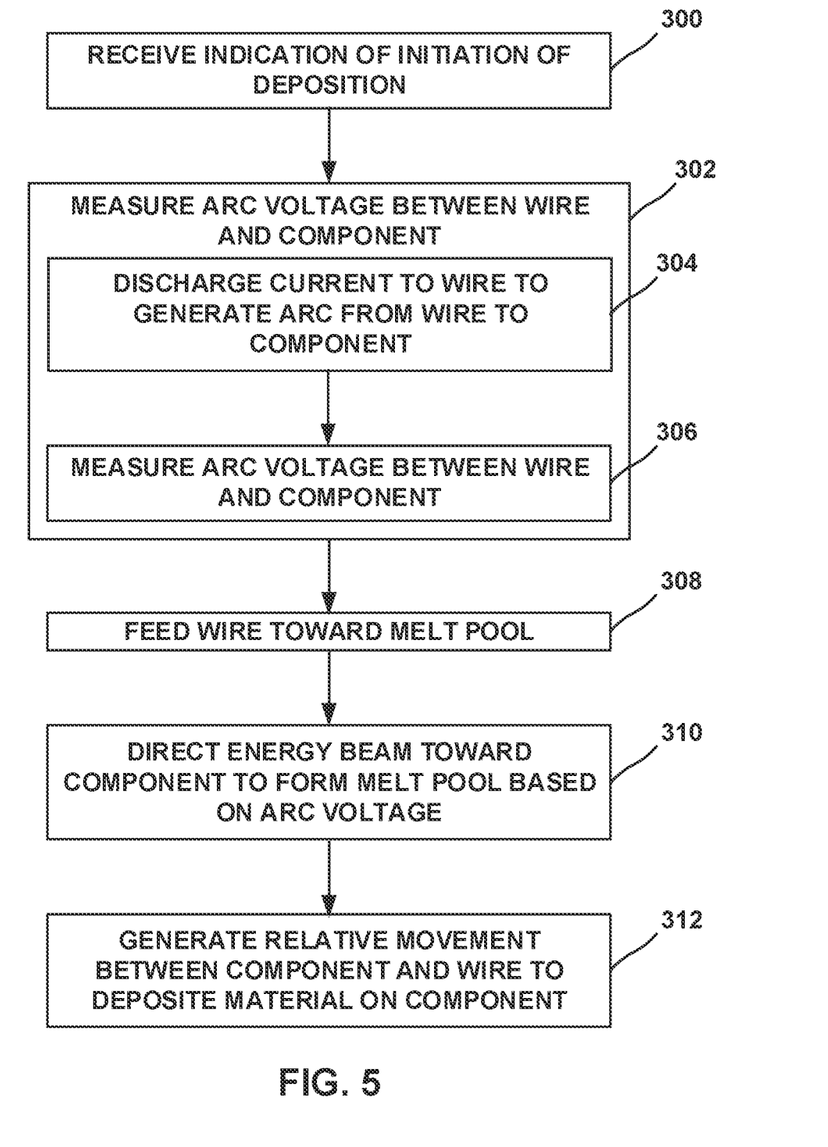
FIG. 5 is a flow diagram illustrating an example technique for controlling an additive manufacturing process.

FIGS. 4A, 4B, 4C, and 5 illustrate an example technique for controlling an additive manufacturing process. FIG. 4A is a side view conceptual diagram illustrating measurement of distance between a material and a substrate during an example additive manufacturing process, FIG. 4B is a side view conceptual diagram illustrating pre-engagement of a material with a substrate during an example additive manufacturing process, FIG. 4C is a side view conceptual diagram illustrating engagement of a material with a substrate during an example additive manufacturing process, and FIG. 5 is a flow diagram illustrating an example technique for controlling an additive manufacturing process. The technique of FIG. 5 will be described with reference to FIGS. 4A, 4B, and 4C. A person having ordinary skill in the art will appreciate that the technique of FIG. 5 may be implemented using other systems.

Referring to FIG. 4A, the method may include receiving an indication of initiation of deposition of material on component 122 (300). For example, computing device 102 may receive the indication, such as from an operator, of initiation of deposition, such as by receiving an input signal representing one or more dimensions corresponding to a predetermined deposition path.

The method includes measuring an arc voltage between wire 110 and component 122 (302). For example, in response to receiving the indication of initiation of deposition, computing device 102 may automatically control material delivery device 104 to measure the arc voltage. The arc voltage represents a distance 164 between wire 110 and component 122. To measure the arc voltage, measurement circuit 136 may discharge a current to wire 110 to generate an arc 162 from wire 110 to the component 122 (304). For example, measurement circuit 136 may increase an arc voltage ($V_A$) until the arc voltage exceeds a threshold voltage ($V_T$) corresponding to ionization behavior of shielding gas 116. As a result, current may flow from wire 110 and component 122 and measurement circuit 136 may detect the flow of current as a closed circuit. In response to detecting the flow of current, measurement circuit 136 may measure the arc voltage of the arc between wire 110 and component 122 (306).

In the example of FIG. 4A, the portion of component 122 to which arc 162 is generated is also a portion of component 122 for which melt pool 118 may be formed. However, in other examples, the portion of component 122 to which arc 162 is generated may be a different portion of component 122. In some examples, computing device 102 may determine, based on the arc voltage, the distance between wire 110 and portion 160 of component 122. For example, computing device 102 may receive an indication of the arc voltage from measurement circuit 136, receive an orientation of wire 110 along a wire feed path, and determine, based on the arc voltage and the orientation of wire 110 along the wire feed path, a feed distance of wire 110 to portion 160.

Referring to FIG. 4B, the method may include feeding wire 110 toward portion 160 of component (308). For example, computing device 102 may control ($S_f$) material delivery device 104 to feed wire 110 toward portion 160 according to a particular feed rate ($F_f$), such as a default feed rate for engagement of wire 110 with melt pool 118. This default feed rate may be different from a wire feed rate for depositing material on component 122.

The method may also include generating and directing energy beam 108 toward portion 160 of component 122 to form melt pool 118 based on the arc voltage (310). Computing device 102 may control ($S_H$) energy source 106 to generate energy beam 108 according to a particular strength ($E_H$) and direct energy beam 108 toward portion 160 of component 122 to form melt pool 118. The timing of energizing energy beam 108 may be based on the measured arc voltage, such that wire 110 may contact melt pool after melt pool 118 has formed. In some examples, computing device 102 may determine a heating time to form melt pool 118, such as according to properties of material of component 122 and the strength of energy beam 108. Computing device 102 may receive, from measurement circuit 136, an indication of distance 164 between wire 110 and component 122, such as an indication of the arc voltage. Computing device 102 may determine, based on distance 164 between wire 110 and component 122 and a wire feed rate of wire 110, a travel time of wire 110 to melt pool 118. Computing device 102 may control energy source 106 to energize energy beam 108 based on the travel time of wire 110 to melt pool 118 and control material delivery device 104 to cause wire 110 to contact melt pool 118 after the heating time.

Referring to FIG. 4C, the method of FIG. 5 includes generating relative movement between wire 110 and component 122 to deposit material on component 122 (312). For example, computing device 102 may control stage 120 to move component 122 relative to wire 110 and energy beam 108 to advance melt pool 118 along a predetermined deposition path, such as to a particular position ($P_{X,Y}$) or along a particular orientation and at a particular speed. Deposition of material on component 122 may include adjusting the strength of energy beam 108 and the wire feed rate of material delivery device 104 for steady state conditions of melt pool 118. For example, computing device 102 may control ($S_B$) energy source 106 to generate energy beam having a particular strength ($E_B$) and direct energy beam 108 toward component 122 to form melt pool 118, and control ($S_F$) material delivery device 104 to feed wire 110 toward the melt pool 118 at a particular wire feed rate ($F_W$). As a result, energy beam 108 and wire 110 may form melt pool 118 having a particular material deposition rate (e.g., material for period of time).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. An additive manufacturing system comprising:
   an energy source configured to direct an energy beam toward a component to form a melt pool; and
   a material delivery device comprising:
     a feed actuator configured to feed a wire toward the melt pool; and
     control circuitry comprising a discharge circuit configured to discharge, in response to a control signal indicating disengagement of the wire, a current to the wire to disengage the wire from the melt pool, wherein a strength of the current is sufficiently large to increase the temperature of at least a portion of the wire above a melting point of the wire to separate a proximal portion of the wire from the melt pool.

2. The additive manufacturing system of claim 1, wherein the discharge circuit further comprises one or more capacitors configured to discharge the current.

3. The additive manufacturing system of claim 1, wherein the current is configured to vaporize at least a portion of the wire to separate a proximal portion of the wire from the melt pool.

4. The additive manufacturing system of claim 1, further comprising a computing device operatively coupled to the material delivery device, wherein the computing device is configured to send the control signal to the control circuitry of the material delivery device to discharge the current to the wire.

5. The additive manufacturing system of claim 4, wherein the computing device is configured to:
   receive an indication of a position of a focal point of the energy source along a deposition path; and
   automatically send the control signal to the control circuitry of the material delivery device to discharge the current in response to receiving an indication of a position of the focal point of the energy source corresponding to completion of the deposition path.

6. The additive manufacturing system of claim 5, wherein the computing device is configured to receive an input signal representing one or more dimensions corresponding to the deposition path.

7. The additive manufacturing system of claim 4, wherein the computing device is operatively coupled to the energy source and configured to send a control signal to the energy source to cease outputting the energy beam substantially simultaneously with the control signal to the material delivery device.

8. The additive manufacturing system of claim 5, wherein the computing device is operatively coupled to the energy source and configured to automatically send a control signal to the energy source to cease outputting the energy beam in response to receiving the indication of the position of the focal point of the energy source corresponding to completion of the deposition path.

9. The additive manufacturing system of claim 5, further comprising an actuation device configured to:
   generate relative movement between the component and the wire corresponding to the deposition path; and
   send the indication of the position of the focal point of the energy source corresponding to completion of the deposition path.

10. The additive manufacturing system of claim 1, wherein the discharge circuit is further configured to detect, after discharge of the current, an open circuit in the wire to verify disengagement of the wire from the melt pool.

11. A method comprising:
   controlling, by a computing device, an energy source to direct an energy beam toward a component to form a melt pool; and
   controlling, by the computing device, a material delivery device to:
      feed a wire toward the melt pool; and
      discharge, in response to a control signal indicating disengagement of the wire, a current to the wire to disengage the wire from the melt pool, wherein a strength of the current is sufficiently large to increase the temperature of at least a portion of the wire above a melting point of the wire to separate a proximal portion of the wire from the melt pool.

12. The method of claim 11, wherein the current is discharged from one or more capacitors.

13. The method of claim 11, wherein the current is configured to vaporize at least a portion of the wire to separate a proximal portion of the wire from the melt pool.

14. The method of claim 11, further comprising:
   receiving, by the computing device, an indication of a position of a focal point of the energy source corresponding to completion of a deposition path; and
   automatically controlling the material delivery device to discharge the current in response to receiving the indication of the position of the focal point of the energy source corresponding to the completion of the deposition path.

15. The method of claim 14, further comprising:
   receiving, by the computing device, an input signal representing one or more dimensions corresponding to the deposition path; and
   controlling, by the computing device, an actuation device to generate relative movement between the component and the wire corresponding to the deposition path.

16. The method of claim 14, further comprising controlling the energy source to cease outputting the energy beam substantially simultaneously with controlling the material delivery device to discharge the current.

17. The method of claim 14, further comprising:
   receiving, by the computing device, the indication of the position of the focal point of the energy source corresponding to completion of the deposition path; and
   controlling, by the computing device, the energy source to cease outputting the energy beam in response to receiving the indication of the position of the focal point of the energy source corresponding to the completion of the deposition path.

18. The method of claim 11, further comprising:
   determining, by the computing device and based on a thickness and resistance of the wire, the current; and
   controlling, by the computing device, the material delivery device to discharge the determined current to the wire.

19. The method of claim 11, further comprising receiving, by the computing device, an indication of an open circuit to verify disengagement of the wire from the melt pool.

20. The additive manufacturing system of claim 2, wherein the discharge circuit is configured to:
   receive an indication or measurement of parameters of the wire; and
   select the one or more capacitors to produce a current sufficient to disengage the wire in a predetermined amount of time based on the parameters of the wire, wherein the parameters of the wire include at least one of a resistance of the wire, a cross-sectional area of the wire, and a length of the wire.

* * * * *